US009174873B2

(12) United States Patent
Laukkanen et al.

(10) Patent No.: US 9,174,873 B2
(45) Date of Patent: Nov. 3, 2015

(54) MATERIAL TO BE USED AS A CONCRETE ADDITIVE

(75) Inventors: Antti Laukkanen, Helsinki (FI); Jan-Erik Teirfolk, Espoo (FI); Markku Leivo, Espoo (FI); Hannele Kuosa, Espoo (FI); Kirsi Kataja, Espoo (FI); Antti Nurmi, Siuntio (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 357 days.

(21) Appl. No.: 13/496,109

(22) PCT Filed: Oct. 1, 2010

(86) PCT No.: PCT/FI2010/050764
§ 371 (c)(1),
(2), (4) Date: May 31, 2012

(87) PCT Pub. No.: WO2011/039423
PCT Pub. Date: Apr. 7, 2011

(65) Prior Publication Data
US 2012/0227633 A1 Sep. 13, 2012

(30) Foreign Application Priority Data

Oct. 2, 2009 (FI) ..................................... 20096009

(51) Int. Cl.
*C04B 14/00* (2006.01)
*C04B 24/00* (2006.01)
(Continued)

(52) U.S. Cl.
CPC ................. *C04B 28/02* (2013.01); *C04B 18/24* (2013.01); *C04B 24/383* (2013.01); *C04B 40/0039* (2013.01); *C04B 2111/00103* (2013.01); *C04B 2111/70* (2013.01); *Y02W 30/97* (2015.05)

(58) Field of Classification Search
CPC ......... C08L 1/02; C08L 97/005; C08L 97/02; C08L 1/00; C08L 2205/16; C08L 1/08; C08K 7/02; C08H 8/00; C08H 6/00; D21C 5/005; D21C 3/00; D21C 9/007; D21H 17/25; D21H 17/24; C08B 1/00; C08B 1/003; C04B 16/0608
See application file for complete search history.

(56) References Cited

U.S. PATENT DOCUMENTS 6,117,226 A  9/2000 Dial et al.
6,464,771 B1 * 10/2002 Matsui et al. ................. 106/470
(Continued)

FOREIGN PATENT DOCUMENTS

EP   0 588 665 A1   3/1994
FR   2 783 437 A1   9/1998
(Continued)

OTHER PUBLICATIONS

Spence, Kelley Lynn. "Processing and Properties of Microfibrillated Cellulose". Retrieved from http://repository.lib.ncsu.edu/ir/bitstream/1840.16/6909/1/etd.pdf.*

*Primary Examiner* — Kaj K Olsen
*Assistant Examiner* — Karam Hijji
(74) *Attorney, Agent, or Firm* — Arent Fox LLP

(57) ABSTRACT

The invention relates to an admixture for a cementitious composition comprising microfibrillar cellulose and/or a derivative thereof. The invention also relates to a method of manufacturing said admixture and to the use of the microfibrillar cellulose and/or a derivative thereof in the concrete admixture. The invention further relates to a cementitious composition comprising said admixture and methods of manufacture and use thereof.

27 Claims, 10 Drawing Sheets

(51) Int. Cl.
*C04B 28/02* (2006.01)
*C04B 18/24* (2006.01)
*C04B 24/38* (2006.01)
*C04B 40/00* (2006.01)
C04B 111/00 (2006.01)
C04B 111/70 (2006.01)

(56) References Cited

U.S. PATENT DOCUMENTS

2002/0166479 A1* 11/2002 Jiang .............................. 106/644
2005/0256262 A1* 11/2005 Hill et al. ....................... 524/702

FOREIGN PATENT DOCUMENTS

| FR | 2 783 437 | A1 | 3/2000 |
| FR | 2 919 602 | A1 | 2/2009 |
| JP | 06-001647 | A | 1/1994 |
| JP | 10-218651 | A | 8/1998 |
| JP | 2005-194168 | A | 7/2005 |
| JP | 2008-120621 | A | 5/2008 |
| JP | 2008-120621 | A | 5/2008 |
| WO | WO 97/22564 | A1 | 6/1997 |
| WO | WO 01/66600 | A1 | 9/2001 |

* cited by examiner

A  B

C  D

MATERIAL TO BE USED AS A CONCRETE ADDITIVE

CROSS-REFERENCE TO RELATED APPLICATION

This Application is a National Stage Entry of International Application No. PCT/FI2010/050764, having an international filing date of Oct. 1, 2010; which claims priority to Finnish Application No. 20096009, filed Oct. 2, 2009; the disclosure of each of which is hereby incorporated in its entirety by reference.

FIELD OF THE INVENTION

The invention relates to an admixture for a cementitious composition wherein the admixture comprises microfibrillar cellulose and/or a derivative thereof and/or labile chemically modified cellulose pulp or cellulose raw material which forms microfibrillar cellulose during the use of the admixture. The invention also relates to a method of manufacturing said admixture. The invention further relates to use of the microfibrillar cellulose and/or a derivative thereof in the concrete admixture. The invention further relates to the use of said admixture or labile cellulose pulp or cellulose raw material in the production of a cementitious composition such as concrete, self compacting concrete, mortar, grout or injection grout. The invention relates to a cementitious composition or cement comprising said admixture and a method thereof as well as to a construction element made of said cementitious composition.

BACKGROUND OF THE INVENTION

Concrete is a construction material made of a mixture of cement, sand, stone, and water. Concrete solidifies and hardens after mixing with water and placement due to a chemical process known as hydration. The water reacts with the cement, which bonds the other components together, eventually creating a stone-like material. Concrete is used to make pavements, architectural structures, foundations, motorways/roads, bridges/overpasses, parking structures, brick/block walls and footings for gates, fences and poles.

In concrete technology an important field of interest is self compacting concrete (SCC), which flows and compacts itself due to gravity. Consequently, no external vibration or other compaction is needed. Hardened concrete will function as normal concrete in the structure. It is possible to produce very high performance concrete as self compacting concretes. Because compacting work is not needed, noise level during construction is lowered remarkable and one working phase is eliminated.

A problem with the SCC is the segregation and the sensitivity of the concrete to variations on raw materials. Due to extensive problems with low and normal strength SCC the use of SCC in low to normal strength concretes is not as wide as it could be. Segregation usually results in concrete with unacceptable properties. Segregation can be either water or aggregate segregation. In water segregation the water phase is separating when the cement particles are settling with time. Aggregate segregation occurs faster when aggregates are settling in the paste phase. Paste is the mixture of water, cement, other fine powders and admixtures. Small variations in raw material composition or moisture content can change SCC behavior dramatically. This lack of robustness in performance is also a hindrance for SCC use.

Accordingly there is a need for improved self-compacting concrete materials. Furthermore, there is a need to increase thixotrophy and particle suspendity in the wet state in standard concrete formulations.

Injection grouts are intended to be used with the pressure grouting technique. Requirements for these materials are among others high fluidity, low segregation and bleeding. In injection grouts very high fluidity is needed. In all applications strength requirements are not very high. That is why the water-cement ratio is in many applications very high. This leads to segregation problems and the penetration of grout is not sufficient.

There have been some attempts to solve the aforementioned problems with viscosity enhancing agents, for example with water soluble polysaccharides, such as welan gum or cellulose derivates. Patent applications GB 2 378 946 and WO 03/018505 disclose preparation of an admixture for cementitious compositions, wherein polysaccharide and/or nanosilica are used as viscosity modifying agents. Patent application US 2003/159391 relates to a lightweight concrete mixture, wherein soluble cellulose derivatives are used as viscosity enhancing agents. The use of e.g. welan gum as stabilizing admixture is widely known in the concrete industry.

Previously, cellulose fibers have been used in concrete materials to improve mechanical properties of materials: for example in US patent application 2005/112981 where cellulose fibers have been used to improve strength properties of dry specimens. Also, cellulose nanowhiskers have been studied as re-enforcement material in concrete, for example in a publication by Kuthcarlapati et al. (Metals Materials and Processes 20(3):307-314, 2008). In addition, the major aim in the publications mentioned above has been to improve mechanical properties of dry specimens i.e. not to influence on wet formulations. Also, in the above mentioned patent applications and publications, the used amount of cellulose fibers has been high.

BRIEF DESCRIPTION OF THE INVENTION

The present invention describes a novel approach to solve the aforementioned problems with segregation and bleeding in concrete formulations. The invention is based on the use of microfibrillar cellulose and/or derivatives thereof in a stabilizing admixture.

The present invention relates to a cement admixture or an admixture for a cementitious composition, wherein the admixture comprises microfibrillar cellulose and/or a derivative thereof, and/or labile chemically modified cellulose pulp or cellulose raw material which forms microfibrillar cellulose during the use of the admixture and optionally water.

A significant advantage of the present invention is that water bleeding of concrete as well as aggregate settlement decreases. The addition of microfibrillar cellulose and/or derivatives thereof increases paste thixotrophy both with and without plasticizer. Water retention ability of microfibrillar cellulose and/or derivatives thereof is a useful property when used as a concrete admixture. In the present invention the admixture comprising microfibrillar cellulose is not used as a reinforcement additive.

It is feasible to use microfibrillar cellulose as a stabilizing admixture especially in concretes with high water/cement (w/c) ratios, i.e. in low to normal strength concretes. Especially, microfibrillar cellulose and/or derivatives thereof help to make self compacting concrete more robust. Water bleeding and aggregate settlement are diminished and thus concrete durability properties are increased. Water bleeding is effectively prevented with the finest fibril additives. Aggregate settlement is also drastically decreased with microfibrillar cellulose. The use of an admixture comprising microfibrillar cellulose and/or derivatives thereof also compensates for too small amount or bad quality of fines.

In aqueous environment microfibrillar cellulose and/or derivatives thereof form a self-assembled hydrogel network even at low concentrations. These gels of microfibrillar cellulose are highly shear thinning and thixotrophic in nature. Due to the intrinsic properties of the microfibrillar cellulose gels, the materials also show strong aggregate suspending power.

Microfibrillar cellulose and/or derivatives thereof have not been previously described to be used as viscosity enhancing agent or stabilizing admixture in concrete applications.

The present invention also relates to a method of manufacturing a cement admixture according to any of the claims of the present invention comprising providing microfibrillar cellulose and/or a derivative thereof, mixing together said microfibrillar cellulose and/or a derivative thereof, and optionally water; and optionally adding at least one plasticizer and/or dispersing agent prior to, during or after providing microfibrillar cellulose to obtain said admixture.

The present invention relates to the use of microfibrillar cellulose and/or a derivative thereof in the concrete admixture. The present invention also relates to the use of microfibrillar cellulose and/or a derivative thereof or a cement admixture according to the present invention rheology or controlling segregation.

The present invention also relates to the use of an admixture according to the present invention in the production of a cementitious composition such as concrete, self compacting concrete, mortar, grout or injection grout. The present invention also relates to the use of labile cellulose pulp and/or cellulose raw material in a concrete admixture or in the production of a cementitious composition such as concrete, self compacting concrete, mortar, grout or injection grout.

The invention further relates to a cementitious composition, comprising the admixture defined in the present invention.

The present invention also relates to a method of manufacturing said cementitious composition, comprising mixing together a cementitious binder, aggregate material, water and an admixture, according to the present invention and as defined in the claims; and optionally adding at least one plasticizer and/or dispersing agent The invention further relates to a construction element made of said cementitious composition and to cement comprising the admixture according to the present invention.

DETAILED DESCRIPTION OF THE INVENTION

Figure 1:
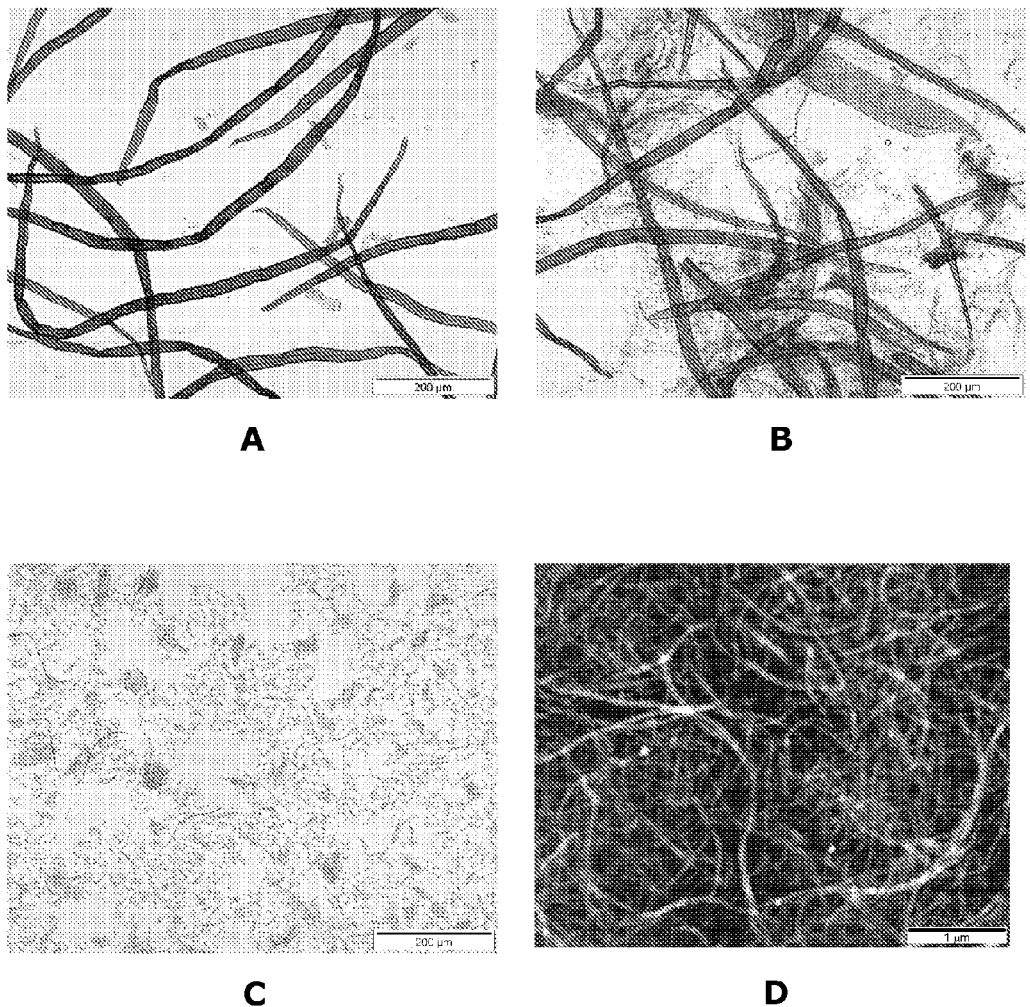
FIG. 1 depicts optical microscopy images of cellulose pulp (A), refined cellulose pulp (B), and microfibrillar cellulose (C), and atomic force microscopy image of microfibrillar cellulose (D).

The present invention describes a novel approach to solve the problems with segregation and bleeding in concrete formulations. Instead of using soluble polysaccharides, the invention is based on the use of microfibrillar cellulose and/or derivatives thereof as stabilizing admixture. In aqueous environment, microfibrillar cellulose forms a continuous hydrogel network of dispersed microfibrils or microfibril bundles. The gel is formed by highly hydrated fibrils that are entangled between each other, even at very low concentrations. The fibrils may interact also via hydrogen bonds. The macroscopic structure is easily destroyed with mechanical agitation, i.e. the gel starts to flow at elevated shear stress. Microfibrillar cellulose and/or derivatives thereof have not been previously described to be used as viscosity enhancing agent or stabilizing admixture in concrete applications.

The present invention relates to a cement admixture wherein the admixture comprises microfibrillar cellulose and/or a derivative thereof and/or labile chemically modified cellulose pulp or cellulose raw material which forms microfibrillar cellulose during the use of the admixture. The invention also relates to a method of manufacturing a cement admixture comprising microfibrillar cellulose and/or a derivative thereof, wherein the method comprises the steps of providing microfibrillar cellulose and/or a derivative thereof, mixing together said microfibrillar cellulose and/or a derivative thereof, and optionally water; optionally adding at least one plasticizer and/or dispersing agent prior to, during or after providing microfibrillar cellulose to obtain said admixture. The invention further relates to the use of microfibrillar cellulose in the concrete admixture and to the use of the admixture of the present invention in the production of a cementitious composition such as concrete, self compacting concrete, mortar, grout or injection grouts. The invention further relates to the use of labile cellulose pulp and/or cellulose raw material in a concrete admixture or in the production of a cementitious composition such as concrete, self compacting concrete, mortar, grout or injection grout.

The invention further relates to a method of manufacturing a cementitious composition, wherein the method comprises the steps of mixing together a cementitious binder, aggregate material, water and an admixture of the present invention. The invention also relates to a cementitious composition comprising an admixture as defined in the present invention as well as to a construction element made of said cementitious composition. The invention further relates to cement comprising the admixture according to the present invention.

Unless otherwise specified, the terms, which are used in the specification and claims, have the meanings commonly used in the construction as well as in the pulp and paper industry. Specifically, the following terms have the meanings indicated below.

The term "self-compacting concrete", also known as self-consolidating concrete or SCC, is a highly flowable, non-segregating concrete that spreads into place, fills formwork, and encapsulates even the most congested reinforcement, all without any mechanical vibration. It is defined as a concrete mixture that can be placed purely by means of its own weight, with no vibration.

The term "cementitious binder" refers to all inorganic materials, which comprise compounds of calcium, aluminium, silicon, oxygen and/or sulphur with sufficient hydraulic activity to solidify or harden in the presence of water.

Cements include, but are not limited to common Portland cements, fast setting or extra fast setting, sulphate resisting cements, modified cements, alumina cements, high alumina cements, calcium aluminate cements and cements which contain secondary components such as fly ash, pozzolana and the like.

The term "cementitious compositions" refers to a material consisting of cementitious binder and at least water. These materials are for example concrete, mortars and grout. Typically concrete for instance consists of cement, water, aggregates and many cases also admixtures.

Instead of cement other cementitious materials such as fly ash and slag cement can be used. Aggregates, generally a coarse aggregate plus a fine aggregate are added as well as chemical admixtures. Concrete aggregates include coarse aggregates such as gravel, limestone or granite and fine aggregates include sand. Crushed stone or recycled crushed concrete are also used as aggregates.

The term "aggregate material" refers to granular material suitable for use in concrete. Aggregates may be natural, artificial or recycled from material previously used in construction. The term "coarse aggregate" means an aggregate wherein the upper size is greater or equal to 4 mm and lower size is greater or equal to 2 mm. The term "fine aggregate" means aggregate with upper size less or equal to 4 mm.

The term "cement/concrete admixture" refers to material added to the mixing process of concrete in small quantities related to the mass of cement to modify the properties of fresh or hardened concrete.

The term "cellulose raw material" refers to any cellulose raw material source that can be used in production of cellulose pulp, refined pulp, or microfibrillar cellulose. The raw material can be based on any plant material that contains cellulose. The raw material can also be derived from certain bacterial fermentation processes. Plant material may be wood. Wood can be from softwood tree such as spruce, pine, fir, larch, douglas-fir or hemlock, or from hardwood tree such as birch, aspen, poplar, alder, eucalyptus or acacia, or from a mixture of softwoods and hardwoods. Non-wood material can be from agricultural residues, grasses or other plant substances such as straw, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo or reed. The cellulose raw material could be also derived from the cellulose-producing micro-organism. The micro-organisms can be of the genus *Acetobacter, Agrobacterium, Rhizobium, Pseudomonas* or *Alcaligenes*, preferably of the genus *Acetobacter* and more preferably of the species *Acetobacter xylinum* or *Acetobacter pasteurianus*.

The term "cellulose pulp" refers to cellulose fibers, which are isolated from any cellulose raw material using chemical, mechanical, thermo mechanical, or chemi thermo mechanical pulping processes. Typically the diameter of the fibers varies between 15-25 µm and length exceeds 500 µm, but the present invention is not intended to be limited to these parameters. An optical microscopy picture of typical "cellulose pulp" is presented in FIG. 1A.

The term "refined pulp" refers to refined cellulose pulp. The refining of cellulose pulp is carried out with suitable equipment such as a refiner, grinder, homogenizer, colloider, friction grinder, fluidizer such as microfluidizer, macrofluidizer or fluidizer-type homogenizer or ultrasound sonicator. Typically, all cellulose fibers have not been fully fibrillated; a large fraction of cellulose fibers with unchanged dimensions are still present in addition to refined cellulose material. The large fibers in the refined pulp may have fibrillated surface. The finest fraction of cellulose based material in the "refined pulp" consists of microfibrillar cellulose, i.e. cellulose microfibrils and microfibril bundles with diameter less than 200 nm. An optical microscopy picture of typical "refined cellulose" is presented in FIG. 1B.

The term "microfibrillar cellulose" refers to a collection of isolated cellulose microfibrils or microfibril bundles derived from cellulose raw material. Microfibrils have typically high aspect ratio: the length might exceed one micrometer while the number-average diameter is typically below 200 nm. The diameter of microfibril bundles can also be larger but generally less than 1 µm. The smallest microfibrils are similar to so called elementary fibrils, which are typically 2-12 nm in diameter. The dimensions of the fibrils or fibril bundles are dependent on raw material and disintegration method. The microfibrillar cellulose may also contain some hemicelluloses; the amount is dependent on the plant source. Mechanical disintegration of microfibrillar cellulose from cellulose raw material, cellulose pulp, or refined pulp is carried out with suitable equipment such as a refiner, grinder, homogenizer, colloider, friction grinder, ultrasound sonicator, fluidizer such as microfluidizer, macrofluidizer or fluidizer-type homogenizer. "Microfibrillar cellulose" can also be directly isolated from certain fermentation processes. The cellulose-producing micro-organism of the present invention may be of the genus *Acetobacter, Agrobacterium, Rhizobium, Pseudomonas* or *Alcaligenes*, preferably of the genus *Acetobacter* and more preferably of the species *Acetobacter xylinum* or *Acetobacter pasteurianus*. "Microfibrillar cellulose" can also be any chemically or physically modified derivate of cellulose microfibrils or microfibril bundles. The chemical modification could be based for example on carboxymethylation, oxidation, esterification, or etherification reaction of cellulose molecules. Modification could also be realized by physical adsorption of anionic, cationic, or non-ionic substances or any combination of these on cellulose surface. The described modification can be carried out before, after, or during the production of microfibrillar cellulose.

There are several widely used synonyms for microfibrillar cellulose. For example: nanocellulose, nanofibrillated cellulose (NFC), nanofibrillar cellulose, cellulose nanofiber, nanoscale fibrillated cellulose, microfibrillated cellulose (MFC), or cellulose microfibrils. In addition, microfibrillar cellulose produced by certain microbes has also various synonymes. For example, bacterial cellulose, microbial cellulose (MC), biocellulose, nata de coco (NDC), or coco de nata. Microfibrillar cellulose described in this invention is not the same material as so called cellulose whiskers, which are also known as: cellulose nanowhiskers, cellulose nanocrystals, cellulose nanorods, rod-like cellulose microcrystals or cellulose nanowires. In some cases, similar terminology is used for both materials, for example by Kuthcarlapati et al. (Metals Materials and Processes 20(3):307-314, 2008) where the studied material was called "cellulose nanofiber" although they clearly referred to cellulose nanowhiskers. Typically these materials do not have amorphous segments along the fibrillar structure as microfibrillar cellulose, which leads to more rigid structure. Cellulose whiskers are also shorter than microfibrillar cellulose; typically the length is less than one micrometer.

An optical microscopy picture of typical "microfibrillar cellulose" is presented in FIG. 1C, wherein the large cellulose fibers are not anymore clearly visible. With higher magnification, in FIG. 1D, individual microfibrils and microfibril bundles with diameter less than 100 nm can be detected.

The term "technical grade microfibrillar cellulose" or "technical MFC" refers to fractionated refined pulp. The material is obtained by removing the larger cellulose fibers from the refined cellulose pulp with a suitable fractionation technique, such as filtration cloth or membrane. In comparison to "Refined pulp", the "Technical MFC" does not contain large fibers, typically 15-25 µm in diameter that are visible in "Cellulose pulp" or in "Refined pulp.

The term "labile cellulose pulp or cellulose raw material" refers to certain modifications of cellulose raw material or cellulose pulp. For example N-oxyl mediated oxidation (e.g. 2,2,6,6-tetramethyl-1-piperidine N-oxide) leads to very labile cellulose material, which is easy to disintegrate to microfibrillar cellulose. Patent applications WO 09/084,566 and JP 20070340371 disclose such modifications.

The term "microfibrillar cellulose L1" or "MFC-L1" refers to microfibrillar cellulose material that is obtained from labilized cellulose pulp. The labilization is based on oxidation of cellulose pulp, cellulose raw material, or refined pulp. Due to the labilization, the cellulose pulp is easy to disintegrate to microfibrillar cellulose. Also, the labilization reaction brings aldehyde and carboxylic acid functionalities on the surface of MFC-L1 fibers. Patent applications WO 09/084,566 and JP 20070340371 disclose such modifications.

The term "microfibrillar cellulose L2" or "MFC-L2" refers to microfibrillar cellulose material that is obtained from labilized cellulose pulp. The labilization is based on carboxymethylation of cellulose pulp, cellulose raw material, or refined pulp. Due to the labilization, the cellulose pulp is easy to disintegrate to microfibrillar cellulose. Also, the labilization reaction brings carboxylic acid functionalities on the surface of MFC-L2 fibers.

The term "plasticizer" refers to a material that increases the fluidity of the cement paste and thereby increases the workability of the concrete at constant water/cement ratio, or permits concrete to be made with a smaller amount of water while maintaining equal workability.

The term "dispersing agent" refers to either a non-surface active polymer or a surface-active substance added to a suspension, usually a colloid, to improve the separation of particles and to prevent settling or clumping.

The term "bleeding of the concrete" refers to formation of a water layer on the surface of concrete caused by a settlement of solids during the plastic phase of concrete.

The term "internal bleeding" refers to internal water separation in concrete structure itself.

The term "injection grout" refers to a special grout that is intended to be used with the pressure grouting technique. Requirements for these materials are among others high fluidity, low segregation and bleeding.

The present invention provides the following embodiments or any combinations thereof.

The present invention provides a cement admixture, wherein the admixture comprises microfibrillar cellulose and/or a derivative thereof and/or labile chemically modified cellulose pulp or cellulose raw material which forms microfibrillar cellulose during the use of the admixture and optionally water.

The admixture may comprise of a mixture which can be for example a solid mixture or a dispersion of microfibrillar cellulose and/or a derivative thereof.

The admixture of the present invention may further comprise at least one plasticizer. An example of the plasticizer comprises polycarboxylic ether or a derivative thereof.

The admixture of the present invention may further comprise at least one dispersing agent. The admixture may furthermore comprise one or more other components such as defoamer, buffer, retarder, pH adjuster, biocide, preservative, accelerator and/or air entrainer.

The admixture of the present invention may comprise microfibrillar cellulose, the diameter of the cellulose microfibril or microfibril bundles being less than 1 µm, preferably less than 200 nm, more preferably less than 100 nm.

The microfibrillar cellulose can be a chemically or physically modified derivative of a cellulose microfibril or microfibril bundles. Microfibrillar cellulose can be obtained from raw material comprising plant material or derived from bacterial fermentation processes. Plant material can be wood as described above.

The admixture of the present invention can comprise labile chemically modified cellulose pulp or cellulose raw material. Modifications of cellulose raw material or cellulose pulp, such as N-oxyl mediated oxidation, lead to very labile cellulose material, which easily disintegrates to microfibrillar cellulose.

The present invention provides a method of manufacturing a cement admixture comprising a mixture of microfibrillar cellulose and/or a derivative thereof, wherein the method comprises the steps of provinding microfibrillar cellulose and/or a derivative thereof, mixing together said microfibrillar cellulose and/or a derivative thereof, and optionally water; and optionally adding at least one plasticizer and/or dispersing agent prior to, during or after providing microfibrillar cellulose to obtain said admixture.

The present invention provides the use of microfibrillar cellulose and/or a derivative thereof in a concrete admixture. The present invention provides the use of the microfibrillar cellulose and/or a derivative thereof or an admixture according to the present invention for modifying rheology or controlling segregation.

The present invention provides the use of the admixture according the present invention in the production of a cementitious composition such as concrete, self compacting concrete, mortar, grout or injection grouts. In a preferred embodiment of the invention the concrete is self compacting concrete.

The present invention also provides the use of labile cellulose pulp and/or cellulose raw material in a concrete admixture or in the production of a cementitious composition such as concrete, self compacting concrete, mortar, grout or injection grout.

In an embodiment of the invention the admixture further comprises a plasticizer and/or a dispersing agent. The microfibrillar cellulose or a derivative thereof may be used in combination with a plasticizer. The plasticizer may be added to the microfibrillar or its raw material cellulose prior to production, after the production or during the production of the microfibrillar cellulose.

The present invention provides a cementitious composition, comprising the admixture according to the present invention. The cementitious composition can further comprise a cementitious binder, aggregate material and water. The cementitious binder may be an inorganic material comprising calcium, aluminium, silicone, oxygen or sulphur compounds with sufficient hydraulic activity to solidify or harden in the presence of water.

In an embodiment of the present invention the cementitious composition comprises an admixture wherein the amount of microfibrillar cellulose is 2% or less by weight of a cementitious binder, more preferably 0.2% or less by weight of a cementitious binder, the lower limit being 0.002% by weight of a cementitious binder and wherein the water to cement ratio is 1.0 or less.

In another embodiment of the present invention the cementitious composition comprises an admixture wherein the amount of microfibrillar cellulose is 2% or less by weight of water, preferably 0.2% or less by weight of water, wherein the water to cement ratio is 1.0 or more.

In an embodiment of the invention the composition further comprises at least one plasticizer and/or at least one dispersing agent.

In an embodiment of the invention the cementitious composition is concrete, preferably self compacting concrete. In another embodiment of the invention the cementitious composition is an injection grout.

The present invention provides a method of manufacturing a cementitious composition according to the present invention, comprising mixing together a cementitious binder, aggregate material, water and an admixture as defined in the present invention; and optionally adding at least one plasticizer and/or dispersing agent.

In an embodiment of the present invention the method of manufacturing a cementitious composition comprises that the amount of microfibrillar cellulose is 2% or less by weight of a cementitious binder, preferably 0.2% or less by weight of a cementitious binder, the lower limit being 0.002% by weight of a cementitious binder, and wherein the water to cement ratio is 1.0 or less.

In another embodiment of the present invention the method of manufacturing a cementitious composition comprises that the amount of microfibrillar cellulose is 2% or less by weight of water, preferably 0.2% or less by weight of water, wherein the water to cement ratio is 1.0 or more.

The present invention provides a construction element made of said cementitious composition. The present invention provides cement comprising the admixture according the present invention.

The invention teaches a novel admixture for a cementitious composition comprising microfibrillar cellulose and/or derivative thereof. A preferred embodiment of the invention relates to use of microfibrillar cellulose as a concrete admixture.

The invention is based on the use of microfibrillar cellulose and/or derivatives thereof as stabilizing admixture in concrete. In aqueous environment, microfibrillar cellulose forms a continuous hydrogel network of dispersed microfibrils or microfibril bundles. The gel is formed by highly hydrated fibrils that are entangled between each other, even at very low concentrations. The fibrils may interact also via hydrogen bonds. The macroscopic structure is easily destroyed with mechanical agitation, i.e. the gel starts to flow at elevated shear stress.

In a specific embodiment of the invention the chemical composition of the materials was identical, only the degree of fibrillation was altered. The average fibre dimensions decreased upon fibrillation.

In aqueous environment cellulose pulp and refined pulp formed a phase separating fiber suspension that did not show any clear thixotrophic behaviour, whereas microfibrillar cellulose forms a self-assembled hydrogel network even at low concentrations. These gels of microfibrillar cellulose are highly shear thinning and thixotrophic in nature. Due to the intrinsic properties of the microfibrillar cellulose gels, the materials also show strong aggregate suspending power.

Laboratory tests were carried out with high water-cement (w/c) grouts. With injection grouts it can be shown that the segregation is lowered with the use of the present admixture. In these tests high water-cement ratio grouts were tested to verify this behaviour. Also rheology tests with wider ranging dosage and different cellulose derivates were performed to specify the best materials and dosages in different applications.

The following examples are given to further illustrate the invention and are not intended to limit the scope thereof. Based on the description, a person skilled in the art will be able to modify the invention in many ways.

EXAMPLES

Materials
Cellulose Material
The following cellulose materials were used in the Examples 1 and 3: Cellulose pulp; (Sample 1), Refined pulp (Sample 2) and Microfibrillar cellulose (Sample 3). The cellulose pulp (sample 1) was bleached birch pulp made with a conventional chemical pulping process. The refined pulp (Sample 2) was prepared from the same cellulose pulp as Sample 1 using a conventional Voith Sulzer refiner (300 kWh/t). The microfibrillar cellulose (Sample 3) was prepared from the refined pulp (Sample 2) using industrial fluidizer.

The dimensions of the used cellulose materials can be estimated from the microscopy images in FIG. 1. In cellulose pulp (FIG. 1A) and in the refined pulp (FIG. 1B), cellulose fibers are clearly visible with normal optical microscope. Typically, the diameter of the large fibers varies between 15-25 μm and length exceeds 500 μm (FIGS. 1A and 1B). In the refined pulp, also finer cellulose fibrils or fibril bundles are present (FIG. 1B). In microfibrillar cellulose, large cellulose fibers are not anymore visible (FIG. 1C). With higher magnification, see AMF image in FIG. 1D, highly entangled individual cellulose microfibrils and fibril bundles can be detected with diameter of 10-100 nm.

The following cellulose materials were used in the Examples 2 and 4: technical grade microfibrillar cellulose (Technical MFC), microfibrillar cellulose L1 (MFC-L1) wherein the labilization is based on oxidation of cellulose pulp, cellulose raw material or refined pulp and microfibrillar cellulose L2 (MFC-L2), wherein the labilization is based on carboxymethylation of cellulose pulp, cellulose raw material, or refined pulp.

Cement

The cement which was used in the injection grout was CEM II/A-M(S-LL) 42.5 N (Finnsementti Oy, Finland).

Example 1

Paste Mixture Rheology Studies
Methods
Mixing

Paste mixing was carried out with a Hobart mortar mixer. Mixing time was 3 minutes (2 min low speed+1 min high speed). Pulp and cellulose material was first mixed manually with water (and optionally with plasticizer) by a whisk.

Rheology

Paste mixture rheology was studied by a viscometer (Rheotest RN4). After mixing paste was introduced into a coaxial cylinder for measurement. Shear rate was varied and shear stress was measured.

Test Setup

Compositions of paste mixtures are presented in Table 1.

TABLE 1

Paste mixture design principles.

|  | Series 1 | Series 2 |
| --- | --- | --- |
| m(water)/m(cement) | 0.45 | 0.45 |
| Fibres | ref = no fibres, fibres 1, 2 and 3 | ref = no fibres, fibres 3 |
| m(fibers)/m(water) | 0.375 w-%, ref = 0% | 0.375 w-%, ref = 0% |
| m(plasticizer)/m(cement) | — | 0.23% |

Fibres 1, 2 and 3 mean (1) Cellulose pulp, (2) Refined pulp and (3) Microfibrillar cellulose.

Immediately after the mixing the rheology of paste mixtures was studied. Test completion took about 15 minutes.

Test Results

Figure 2:
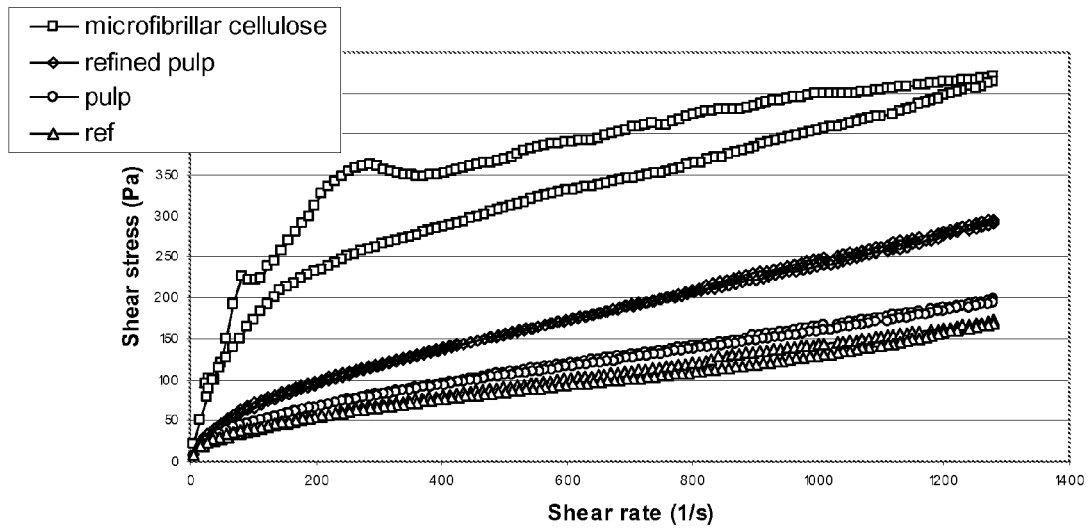
FIG. 2 depicts paste mixture rheology studies. Shear stress (Pa) vs. shear rate (1/s) for a reference paste without plasticizer and for a mixture comprising microfibrillar cellulose, refined pulp or pulp is presented.
Figure 3:
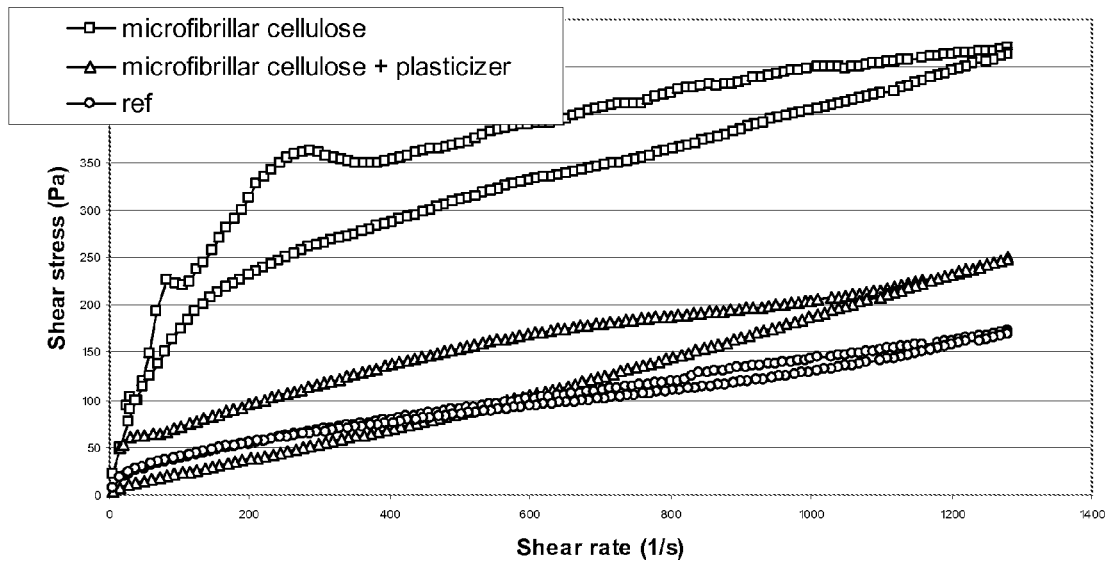
FIG. 3 depicts paste mixture rheology studies. Shear stress (Pa) vs. shear rate (1/s) for a reference paste without plasticizer and for a mixture comprising microfibrillar cellulose with and without plasticizer is presented.

Test results are presented in FIGS. 2 and 3.

Based on rheology testing (FIG. 2) it can be concluded that microfibrillar cellulose fibres increase paste yield value and increase thixotrophy.

It was also noticed that the refined pulp worked a little bit in the same way as microfibrillar cellulose, but increased yield value and thixotrophy less, because the amount of microfibrillar cellulose is low in refined pulp.

It was seen how microfibrillar cellulose fibres interact with a polycarboxylate based plasticizer (FIG. 3). Plasticizer lowered paste yield-value as expected, but thixotrophy was, however, not destroyed. This was opposite to the typical behaviour with some inorganic nanoparticles—already a small amount of plasticizer has been found to destroy thixotrophy.

Example 2

Paste Mixture Rheology Studies for Samples: Technical MFC, MFC-L1, and MFC-L2
Methods
Mixing Paste mixing was carried out with a Hobart mortar mixer. Mixing time was 3 minutes (2 min low speed+1 min high speed). Pulp and cellulose material was first mixed manually with water (and optionally with plasticizer) by a whisk.

Rheology

Paste mixture rheology was studied by a viscometer (Rheotest RN4). After mixing paste was introduced into a coaxial cylinder for measurement. Shear rate was varied and shear stress was measured.

Test Setup

Compositions of paste mixtures are presented in Table 2. Water/cement ratio of prepared pastes were adjusted in order to get identical workability for all pastes. This correspond almost constant yield values.

TABLE 2

Compositions of the paste mixtures and corresponding rheology results.

| Sample (additive) | Dosage | | | Yield | |
| --- | --- | --- | --- | --- | --- |
|  | m(additive)/ m(cement) | m(plasticizer)/ m(cement) | m(water)/ m(cement) | stress (Pa) | Viscosity (Pa s) |
| Reference | 0.00% |  | 0.40 | 231 | 0.30 |
| Technical MFC | 0.13% |  | 0.47 | 220 | 0.19 |
| Technical MFC | 0.25% |  | 0.54 | 197 | 0.13 |
| Technical MFC | 0.50% |  | 0.64 | 177 | 0.09 |
| Technical MFC | 1.00% |  | 0.80 | 199 | 0.07 |
| MFC-L1 | 0.25% |  | 0.54 | 185 | 0.28 |
| MFC-L2 | 0.06% |  | 0.47 | 244 | 0.19 |
| MFC-L2 | 0.13% |  | 0.52 | 252 | 0.18 |
| MFC-L2 | 0.25% |  | 0.59 | 253 | 0.13 |
| MFC-L2 | 0.50% |  | 0.75 | 266 | 0.08 |
| Reference | 0.00% | 0.09% | 0.36 | 276 | 0.63 |
| Technical MFC | 0.25% | 0.09% | 0.48 | 167 | 0.27 |
| Technical MFC | 0.50% | 0.09% | 0.61 | 135 | 0.14 |
| Technical MFC | 1.00% | 0.09% | 0.73 | 245 | 0.12 |
| MFC-L1 | 0.25% | 0.09% | 0.44 | 281 | 0.46 |
| MFC-L2 | 0.25% | 0.09% | 0.54 | 321 | 0.26 |

Immediately after mixing the rheology of paste mixtures was studied. Test completion took about 15 minutes.

Test Results

Figure 4:
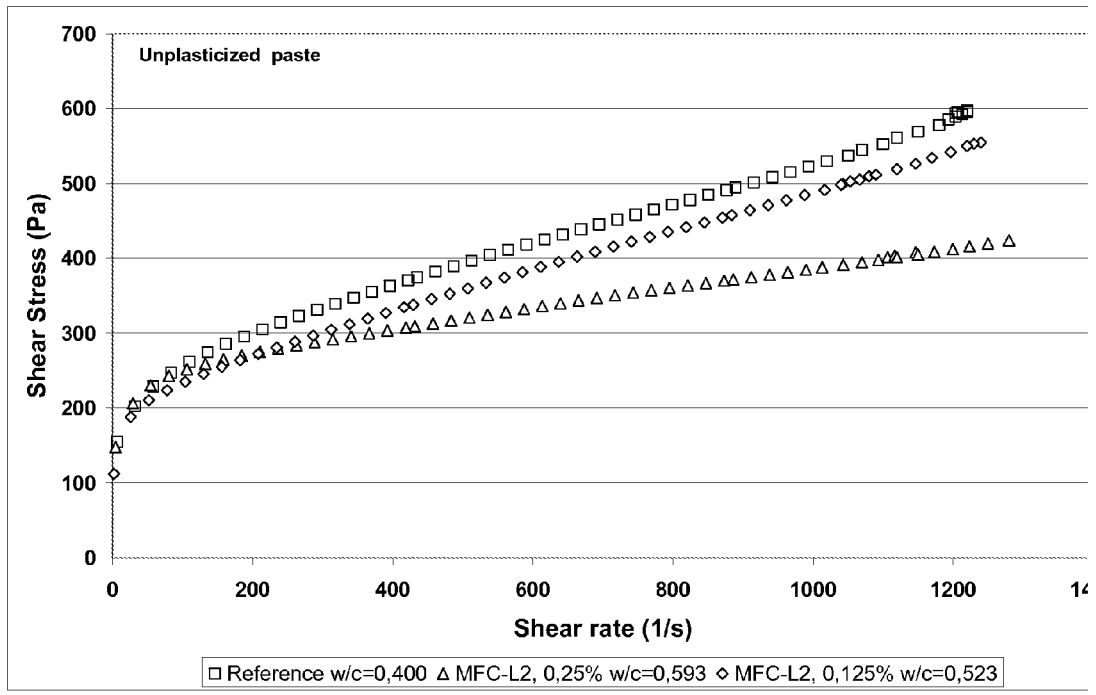
FIG. 4 depicts shear stress (Pa) vs. shear rate (1/s) of unplasticized paste. Water to cement (w/c) ratios of the reference. MFC-L2 0.25% and MFC-L2 0.125% are 0.400, 0.593 and 0.539, respectively.
Figure 5:
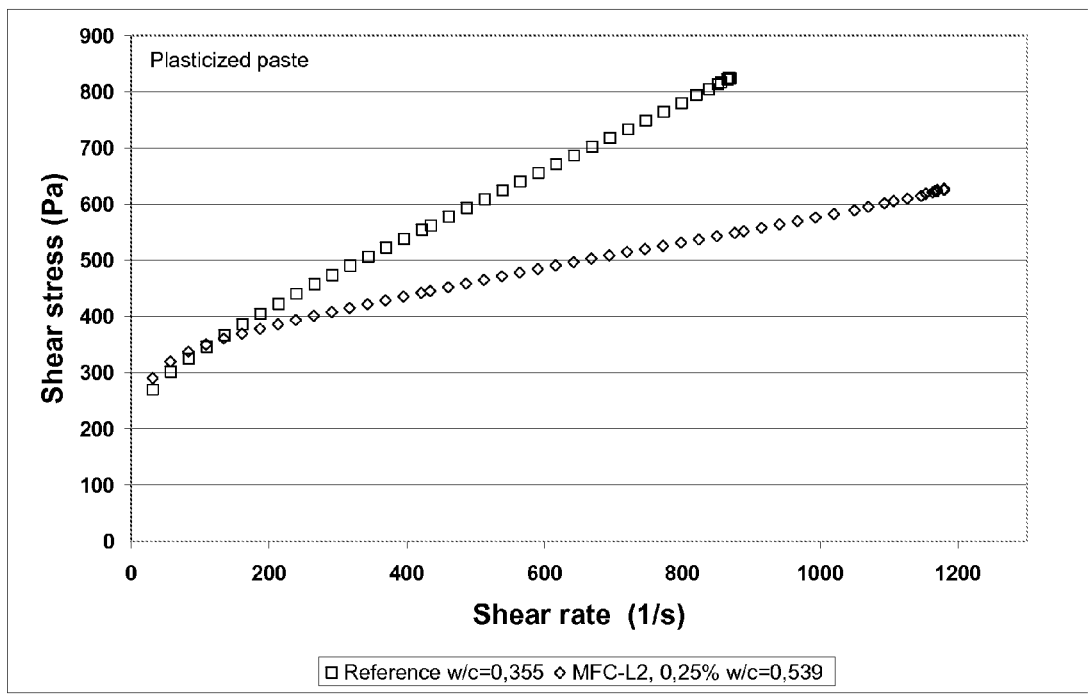
FIG. 5 depicts shear stress (Pa) vs. shear rate (1/s) of plasticized paste. Water to cement (w/c) ratios of the reference and MFC-L2 0.25% are 0.355 and 0.539, respectively.

Test results are presented in Table 2 and in FIGS. 4 and 5.

With these MFC additives it was possible to make pastes with much higher water/cement ratio with the same workability and stability. With reference paste suitable workability in this example was achieved by using higher cement content.

Compared with the example 1 effect of increasing yield value was also seen.

Example 3

Studies on Concrete Mixtures Comprising Cellulose Material as an Admixture

Methods

Mixing

Concrete mixing was done according to standard EN 196-1 (Methods of testing cement—Part 1: Determination of strength). Pulp and cellulose material was first mixed manually with water (and optionally with plasticizer) by a whisk.

Rheology

Concrete (aggregate<8 mm) workability was measured with Haegermann Flow table. Flow [mm] was measured before and after 15 shocks according to DIN 18550 standard.

Water Bleeding

Concrete water bleeding [vol. %] was measured 1 h and 3 h after mixing. Fresh mixture was casted in a 0.5 liter bowel after mixing was completed. Test setup was an adaptation from the standard SFS 5290.

Strength Studies

Concrete specimens (40×40×160 mm) were casted for strength studies. Compressive and flexural strength [MPa] was measured after 1 d, 7 d and 28 d [EN 196-1]. Compressive strength was calculated as the average of 6 values and flexural strength as the average of 3 values.

Thin Section Studies

Petrographic thin sections were prepared for optical microscopical studies. Thin sections were impregnated by a fluorescent epoxy. The final size of a thin section was 35 mm×55 mm×25 µm. Micrographs of thin sections were taken by Leica Qwin-image analyzer.

Test Setup 1.5% microfibrillar cellulose dispersion was tested in standard EN 196-1 concrete formulations. Maximum aggregate size was <8 mm ("CEN Reference sand"). Conventional cellulose pulp and refined cellulose pulp were also used. Reference mixes with no additives were also made. Fluidity, rheology, and water retention of wet formulations were studied and flexural strength, compression strength, and microstructure of hardened specimens were evaluated.

Information on material solid content and compositions of concrete mixtures are presented in Table 3.

TABLE 3

Composition of concrete mixtures comprising (1) cellulose pulp, (2) refined cellulose pulp or (3) microfibrillar cellulose as well as a reference sample containing no cellulose material.

| | Materials [kg/m³] | | | | |
| --- | --- | --- | --- | --- | --- |
| Mix | Cement CEM I 52.5N | Aggregate (DIN standard) | Water | Plasticizer (Glenium 51) | Cellulose product (solid) |
| Reference | 510 | 1529 | 255 | 8.2 | 0 |
| (1) Cellulose pulp | 509 | 1528 | 255 | 8.1 | 0.83 |
| (2) Refined pulp | 509 | 1527 | 253 | 8.1 | 2.56 |
| (3) Microfibrillar cellulose | 509 | 1528 | 255 | 8.1 | 0.83 |

Results

Fresh Concrete

When mixing cellulose materials first with concrete and water by whisk, it was noticed, that obtaining an even dispersion was not possible using cellulose pulp (1) and refined pulp (2). Based on visual evaluation microfibrillar cellulose (3) was dispersed more uniformly than cellulose pulp (1) and refined cellulose pulp (2).

Figure 6:
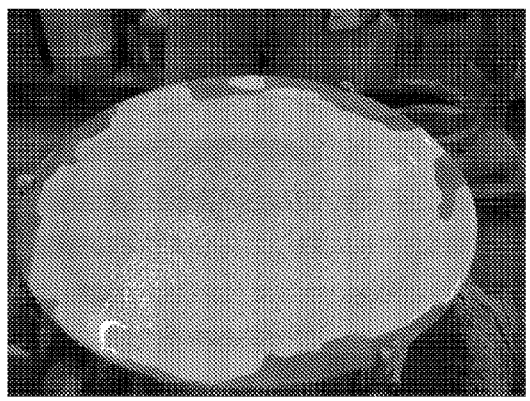
FIG. 6 presents spread results from Flow-measurement after 15 shocks for a reference sample (A); in the concrete mixtures comprising cellulose pulp (B), refined cellulose pulp (C) or microfibrillar cellulose (D).
Figure 6:
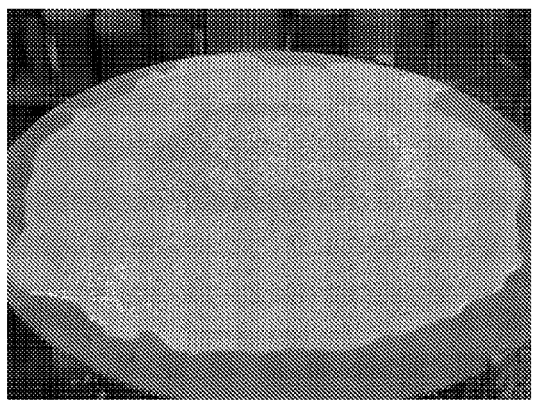
Figure 6:
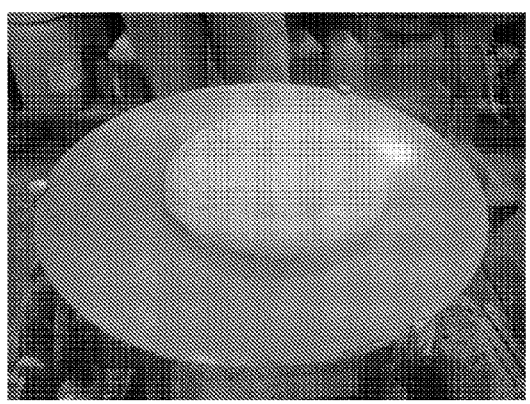
Figure 6:
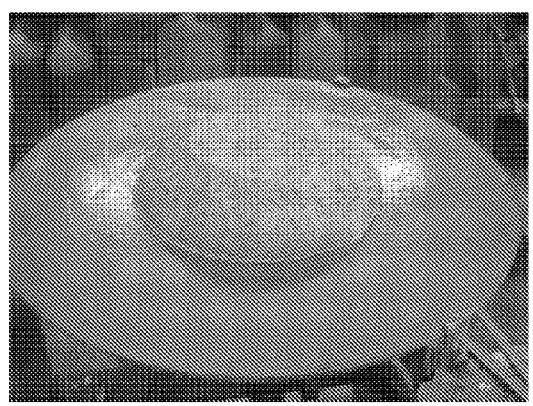

Concrete water bleeding was measured 1 hour and 3 hours after mixing. Results for bleeding are presented in Table 4. Rheology results are also presented in Table 4 and photos of the measurements in FIG. 6.

TABLE 4

Results for flow and bleeding on a reference sample and concrete mixtures comprising (1) cellulose pulp, (2) refined cellulose pulp or (3) microfibrillar cellulose.

| | Dosage | Flow | | Bleeding | |
| --- | --- | --- | --- | --- | --- |
| Mix | (% of cement) | 0 shocks | 15 shocks | After 1 hour | After 3 hours |
| Reference | 0 | 235 | 245 | 6.1% | 6.6% |
| (1) Cellulose pulp | 0.16 | 210 | 235 | 3.5% | 4.1% |
| (2) Refined pulp | 0.50 | 100 | 150 | 0.2% | 0.8% |
| (3) Microfibrillar cellulose | 0.16 | 100 | 140 | 0.4% | 0.9% |

In the reference mixture with no cellulose there was heavy bleeding. Flow value was high, 245 mm, but the mixture segregated also in Flow testing (FIG. 6A).

In the concrete mixture comprising microfibrillar cellulose there was insignificant bleeding (<1%). Flow value was intermediate, 140 mm (see also FIG. 6D).

In the concrete mixture comprising refined cellulose pulp there was insignificant bleeding (<1%). Flow value was intermediate, 150 mm (FIG. 6C). It is to be noticed that the added amount of refined pulp was ca 3 times higher than the amount of microfibrillar cellulose (Table 4).

In the concrete mixture comprising cellulose pulp there was heavy bleeding. Flow value was high, 235 mm, but the mixture segregated also in Flow testing (FIG. 6B).

Hardened Concrete

Figure 7:
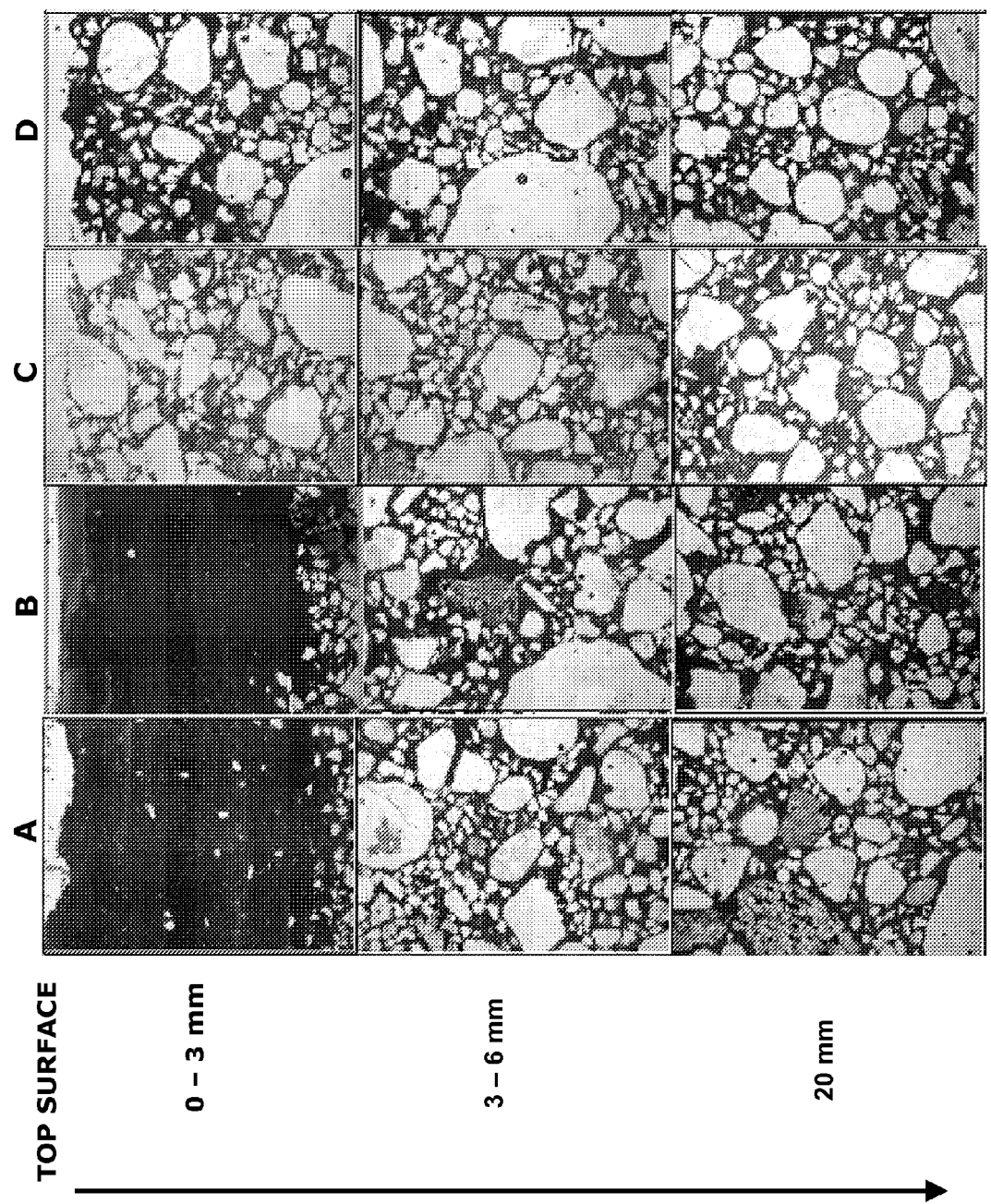
FIG. 7 depicts results for optical thin section studies presenting segregation in a reference sample (A), in the concrete mixtures comprising cellulose pulp (B), refined cellulose pulp (C) or microfibrillar cellulose (D). Height of each picture is 2.75 mm. Segregation is presented 0-3 mm, 3-6 mm and about 20 mm below the surface.

Thin section studies (FIG. 7) show that in the reference concrete mixture (A) there was heavy bleeding and aggregate settlement. Water and paste were separated on the surface of the concrete, whereas the aggregate was at the bottom.

In the concrete mixture comprising microfibrillar cellulose there was no aggregate settlement, as can be seen in FIG. 7D.

In the concrete mixture comprising refined cellulose pulp there was no aggregate settlement, as can be seen in FIG. 7C. Again it is to be noticed that the added amount of refined pulp was ca. 3 times higher than the amount of microfibrillar cellulose (Table 4).

In the concrete mixture comprising cellulose pulp there was heavy aggregate settlement. Water and paste were separated on the surface of the concrete, as can be seen in FIG. 7C.

It is noticed that lower dosage of cellulose material is needed when microfibrillar cellulose is used in the concrete mixture compared to the use of refined cellulose pulp because the amount of microfibrillar cellulose is lower in refined pulp.

Figure 8:
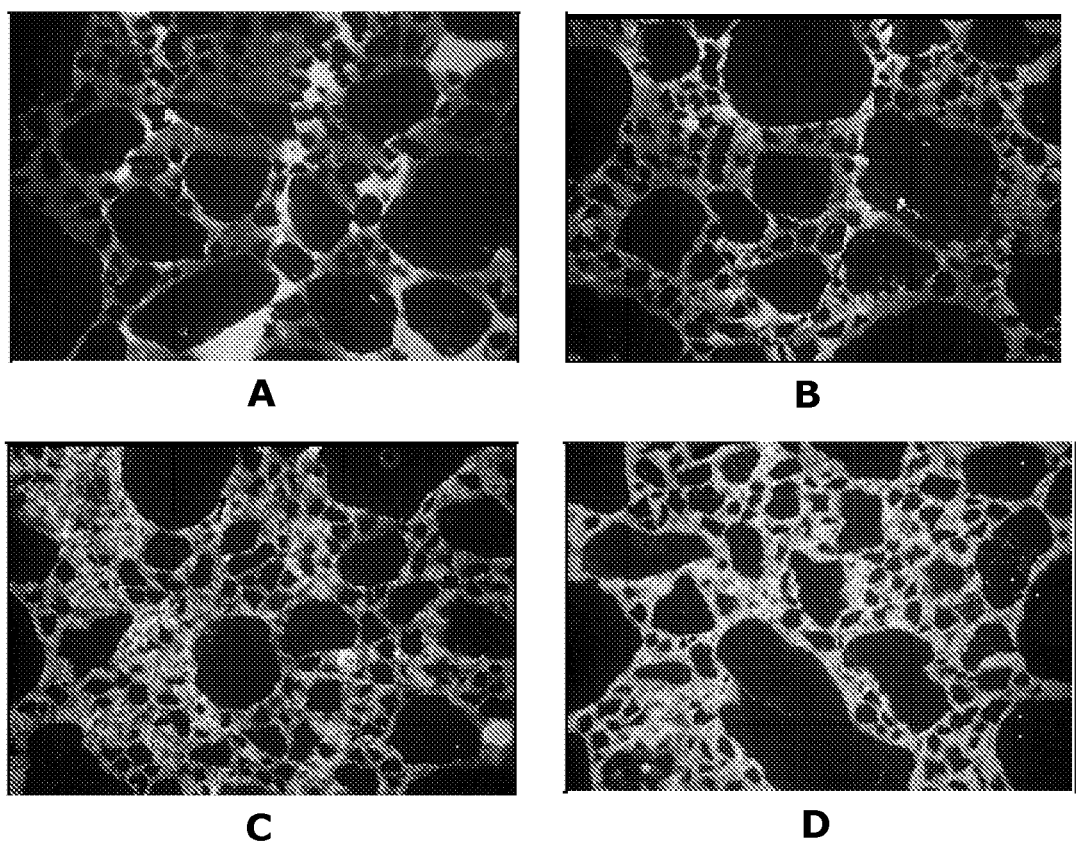
FIG. 8 depicts results for optical thin section studies by presenting the microstructure in UV light in a reference sample (A), in the concrete mixtures comprising cellulose pulp (B), refined cellulose pulp (C) or microfibrillar cellulose (D). Height of each picture is 2.75 mm.

Microstructure was also studied with UV light. Results for optical thin section studies are presented in FIG. 8. It can be seen that there was heavy, clearly abnormal, internal bleeding in a reference sample (FIG. 8A). Internal bleeding had created a channel network inside the concrete. There was also some internal bleeding in a concrete mixture comprising cellulose pulp (FIG. 8B), whereas there was no internal bleeding in mixtures comprising refined cellulose pulp (FIG. 8C) or microfibrillar cellulose (FIG. 8D), wherein the microstructure was good and homogenous. Internal bleeding and internal channel network reduced concrete tightness and durability properties in the reference sample and in the concrete mixture comprising cellulose pulp.

Compressive strength and flexural strength measurements showed that there was no significant strength effect of cellulose on any of these test mixes.

Example 4

Injection Grout Water Bleeding and Viscosity Studies Using Technical Grade Microfibrillar Cellulose and MFC-L1
Methods
Mixing Injection grout mixing was performed by a high speed mixer (Desoi AKM-70 D). Mixing of cement, water and cellulose was always carried out at 5000 rpm. Water was added first, then cellulose with a short premixing time (less than 5 s) and then cement. Mixing time with cement was 2 minutes. In some cases there was 2 min premixing (or dispersing) of cellulose at 5 000 or 10 000 rpm.
Fresh Injection Grout Testing Methods Water bleeding was measured by pouring one (1) liter grout into a graduated measuring glass (volume 1000 ml and diameter 60 mm) and by measuring the bleed water amount until 2 hours.

Figure 9:
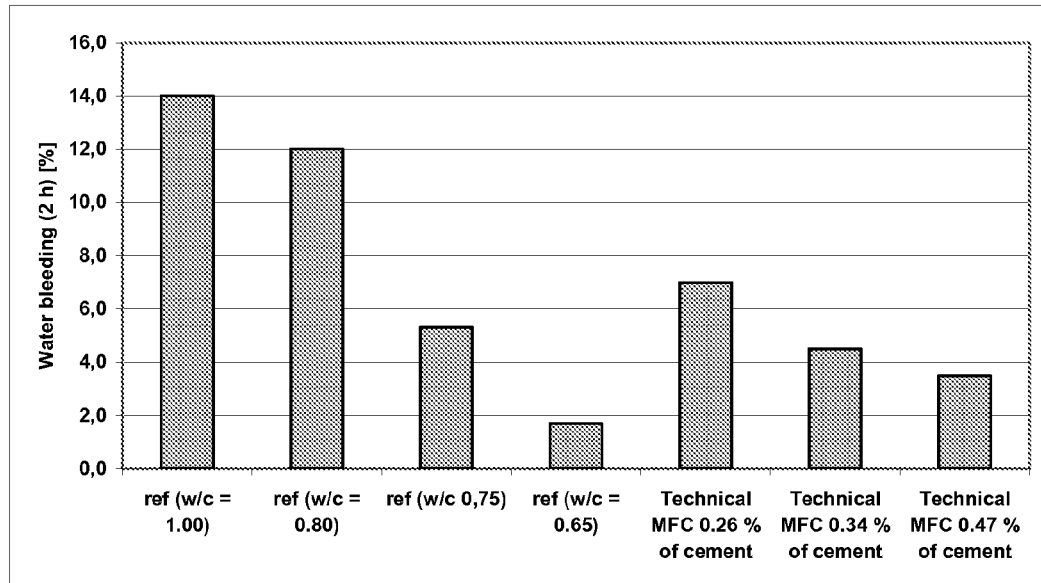
FIG. 9 depicts water bleeding (after 2 h) for reference mixtures with w/c 0.65-1.00 and for mixtures with cellulose fibres (Technical MFC) and always with w/c 1.00.
Figure 10:
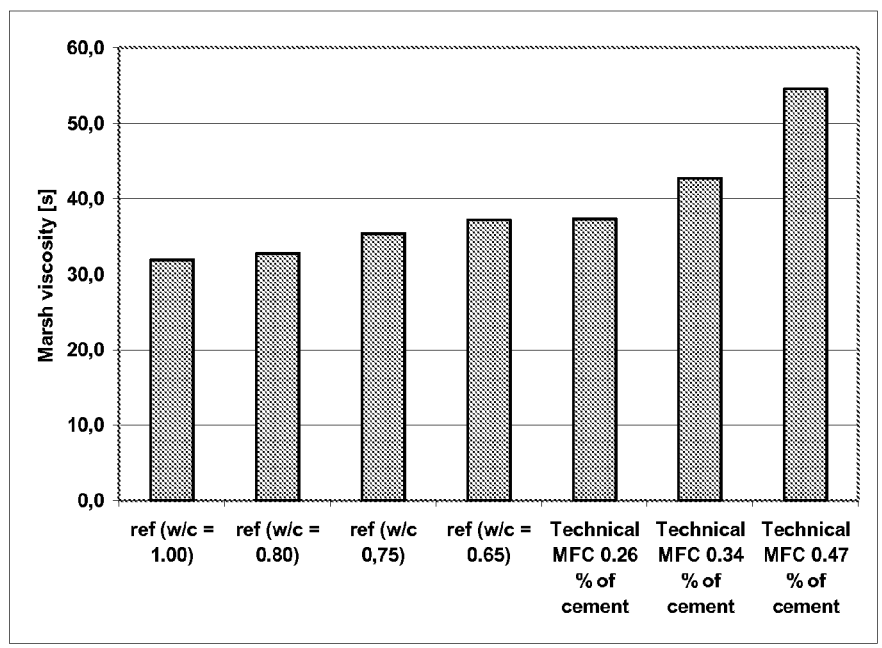
FIG. 10 depicts Marsh viscosity values for reference mixtures with w/c 0.65-1.00 and for mixtures with cellulose fibres (Technical MFC) and always with w/c 1.00.
Figure 11:
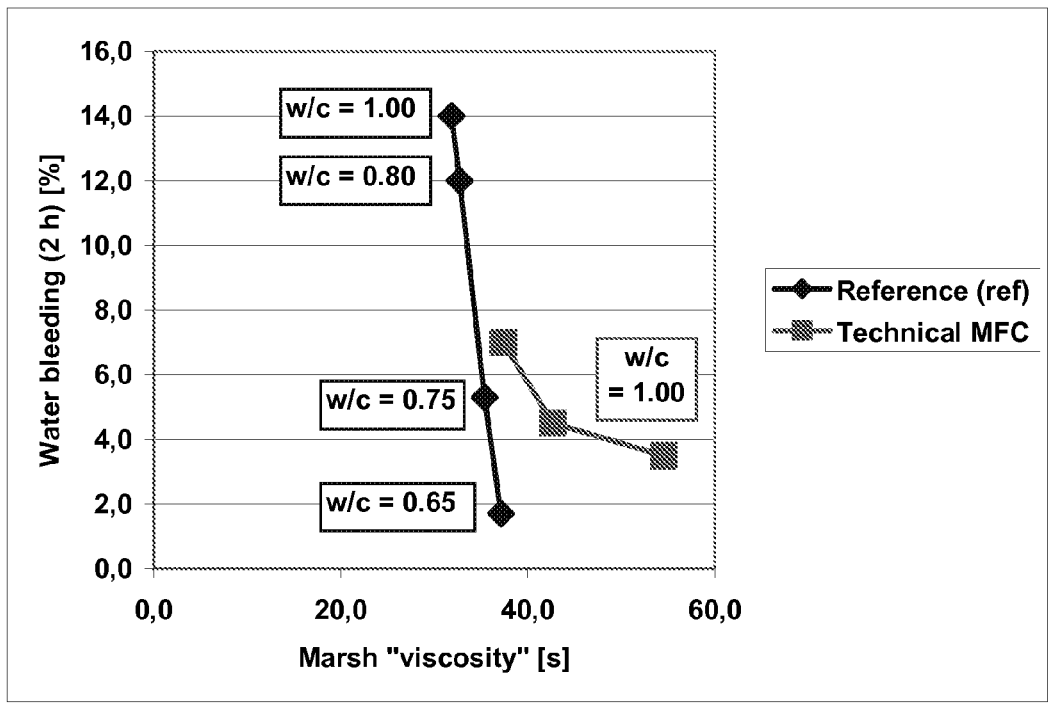
FIG. 11 depicts Marsh viscosity and water bleeding values for reference mixtures with w/c 0.65-1.00 and for mixtures with cellulose (Technical MFC) and always with w/c 1.00.

Marsh viscosity was measured using a Marsh funnel and according to [EN 14117].
Test Setup and Results Compositions and testing results for reference injection grout mixtures and for mixtures containing Technical grade microfibrillar cellulose (Technical MFC) are presented in Table 5 and FIGS. 9 to 11.

TABLE 5

Compositions of injection grout mixtures containing technical grade microfibrillar cellulose (Technical MFC).

|  | Reference | | | | Technical MFC | | |
| --- | --- | --- | --- | --- | --- | --- | --- |
|  | Ref. 1 | Ref. 2 | Ref. 3 | Ref. 4 | Mix 1 | Mix 2 | Mix 3 |
| Cellulose product dry material content [%] | — | — | — | — | 3.81 | 3.81 | 3.81 |
| Cellulose product water content [%] | — | — | — | — | 96.19 | 96.19 | 96.19 |
| Cement [kg/m$^3$] | 756 | 891 | 932 | 1028 | 755 | 754 | 754 |
| Total water [kg/m$^3$] | 756 | 713 | 699 | 668 | 755 | 754 | 754 |
| Cellulose product incl. water [kg/m$^3$] | 0 | 0 | 0 | 0 | 52.10 | 67.29 | 92.94 |
| Cellulose product dry material [kg/m$^3$] | 0 | 0 | 0 | 0 | 1.99 | 2.57 | 3.54 |
| Cellulose product water [kg/m$^3$] | 0 | 0 | 0 | 0 | 50.11 | 64.72 | 89.40 |
| Dry cellulose [% of cement] | 0 | 0 | 0 | 0 | 0.263 | 0.340 | 0.470 |
| Dry cellulose [% of water] | 0 | 0 | 0 | 0 | 0.263 | 0.340 | 0.470 |
| w/c | 1.00 | 0.80 | 0.75 | 0.65 | 1.00 | 1.00 | 1.00 |
| Mix temperature [° C.] | 25.2 | 24.9 | 23.2 | 24.7 | 24.5 | 23.3 | 23.6 |
| Marsh viscosity [s] | 31.9 | 32.8 | 35.4 | 37.2 | 37.4 | 42.7 | 54.5 |
| Water bleeding [%] | — | — | — | — | — | — | — |
| at [h] | — | — | — | — | — | — | — |
| 0.00 | 0 | 0 | 0 | 0 | 0 | 0 | 0 |
| 0.75 | 5.0 | 6.5 | 2.8 | 1.0 | 3.0 | 2.2 | 1.8 |
| 1.00 | 10.0 | 10.0 | 4 | 1.3 | 4.0 | 2.8 | 2.3 |
| 2.00 | 14.0 | 12.0 | 5.3 | 1.7 | 7.0 | 4.5 | 3.5 |

Figure 12:
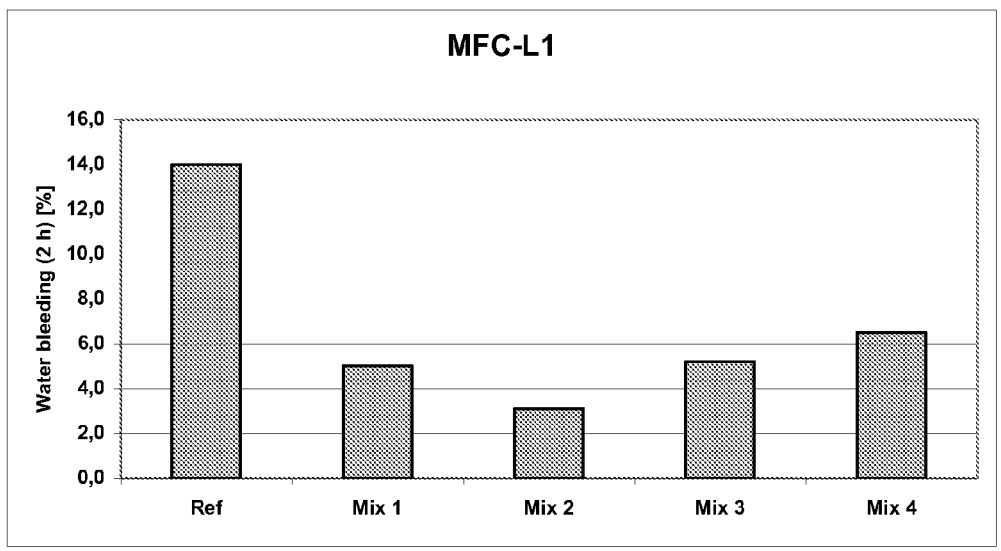
FIG. 12 depicts water bleeding (after 2 h) for reference mixtures with w/c 1.00 and for mixtures with cellulose fibres (MFC-L1) and also with w/c 1.00.
Figure 13:
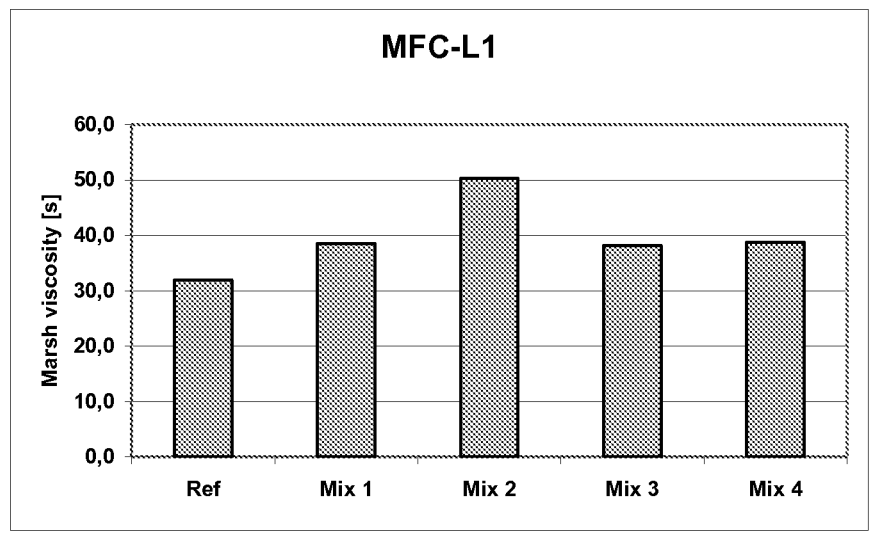
FIG. 13 depicts Marsh viscosity values for reference mixtures with w/c 1.00 and for mixtures with cellulose fibres (MFC-L1) and also with w/c 1.00.
Figure 14:
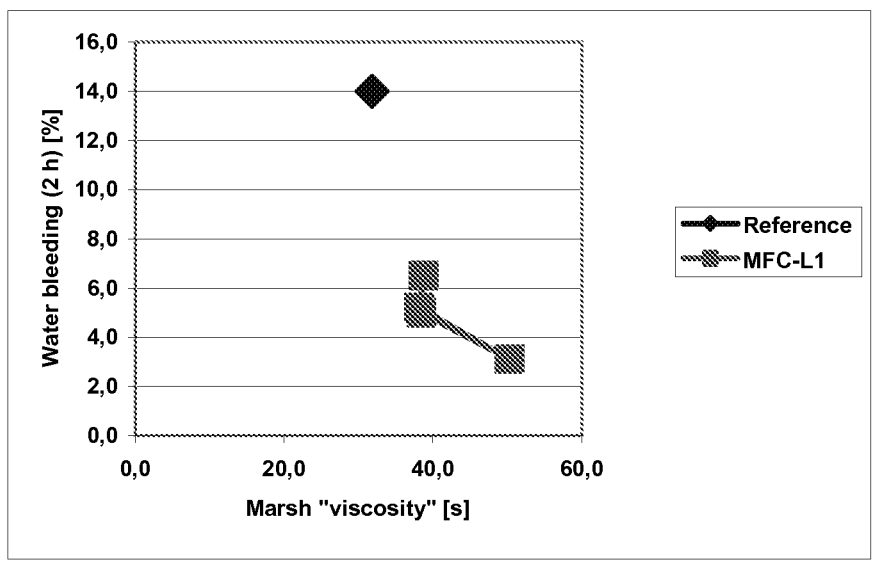
FIG. 14 depicts Marsh viscosity and water bleeding values for reference mixture and for mixtures with cellulose (MFC-L1). All mixtures have w/c 1.00.

Injection grout mixture compositions containing microfibrillar cellulose fibres obtained form labilised cellulose pulp (MFC-L1) are presented in Table 6 and FIGS. 12-14. For three mixtures (Mixture 2, 3 and 4) there was 2 min premixing (or dispersing) of cellulose at 5 000 or 10 000 rpm.

The mixtures shown in Table 6 were mixed and premixed with water only in the following manner:

Reference sample: First water+cement+mixing (5000 rpm, 2 minutes)

Mixture 1: ref (w/c=1.00)—Water and cement were mixed at 5000 rpm for 1 minute. Cellulose was added to the mixture and mixing was carried out at 5000 rpm for 2 minutes.

Mixture 2: dry cellulose 0,100% of cement—Cellulose and water were mixed at 5000 rpm for 2 minutes. Cement was added to the mixture and mixing was carried out at 5000 rpm for 2 minutes.

Mixture 3: dry cellulose 0.05% of cement—Cellulose and water were mixed at 10000 rpm for 2 minutes. Cement was added to the mixture and mixing was carried out at 5000 rpm for 2 minutes.

Mixture 4: dry cellulose 0.05% of cement—Cellulose and water were mixed at 5000 rpm for 2 minutes. Cement was added to the mixture and mixing was carried out at 5000 rpm for 2 minutes.

TABLE 6

Compositions of injection grout mixtures containing microfibrillar cellulose fibres obtained form labilised cellulose pulp (MFC-L1).

| | | MFC-L1 | | | |
|---|---|---|---|---|---|
| | Ref | Mix 1 | Mix 2 | Mix 3 | Mix 4 |
| Cellulose product dry material content [%] | — | 0.99 | 0.99 | 0.99 | 0.99 |
| Cellulose product water content [%] | — | 99.01 | 99.01 | 99.01 | 99.01 |
| Cement [kg/m$^3$] | 756 | 756 | 756 | 756 | 756 |
| Total water [kg/m$^3$] | 756 | 756 | 756 | 756 | 756 |
| Cellulose product incl. water [kg/m$^3$] | 0 | 76.29 | 76.29 | 38.15 | 38.15 |
| Cellulose product dry material [kg/m$^3$] | 0 | 0.76 | 0.76 | 0.38 | 0.38 |
| Cellulose product water [kg/m$^3$] | 0 | 75.54 | 75.54 | 37.77 | 37.77 |
| Dry cellulose [% of cement] | 0 | 0.100 | 0.100 | 0.050 | 0.050 |
| Dry cellulose [% of water] | 0 | 0.100 | 0.100 | 0.050 | 0.050 |
| w/c | 1.00 | 1.00 | 1.00 | 1.00 | 1.00 |
| Mix temperature [° C.] | 25.2 | 23.5 | 24 | 25.6 | 24.3 |
| Marsh viscosity [s] | 31.9 | 38.5 | 50.3 | 38.2 | 38.8 |
| Water bleeding [%] | — | — | — | — | — |
| at [h] | — | — | — | — | — |
| 0.0 | 0.0 | 0 | 0.0 | 0.0 | 0.0 |
| 0.8 | 5.0 | 2.5 | 2.0 | 3.0 | 3.8 |
| 1.0 | 10.0 | 3.0 | 2.2 | 3.8 | 5.0 |
| 2.0 | 14.0 | 5.0 | 3.1 | 5.2 | 6.5 |

The experiments showed, that microfibrillar cellulose fibres decreased injection grout water bleeding and increased viscosity. Relative Marsh viscosity increase was smaller than relative decrease of bleeding, e.g. 17% v.s. 50% (Technical MFC) 0.263% of cement, when w/c is 1.00) and e.g. 20% v.s. 63% (MFC-L1) 0.05% of cement, when w/c is 1.00).

Water bleeding tests showed that microfibrillar cellulose fibres decreased water bleeding of a w/c 1.00 grout to the level of a reference mixture with a lower w/c. E.g. cellulose fibre (Technical MFC) amount 0.34 w.-% of dry cement in a w/c 1.00 mixture gave about as low water bleeding as in reference mixture with w/c 0.75.

Based on Marsh viscosity testing it can be concluded, that microfibrillar cellulose fibres increased viscosity of a w/c 1.00 grout to the level of a reference mixture with a lower w/c. Increase of Marsh viscosity depends on the added amount of cellulose fibres. If the added amount is not too high, viscosity increase is small.

Example 5

Making the Microfibrillar Cellulose from Labilized Pulp during Grout Preparation The microfibrillar cellulose additive can be prepared from a labilised cellulose pulp during the preparation of the wet cementitious formulation using the machinery typically used in the industry. For example, high speed mixers, like Desoi AKM-70D, are commonly used to homogenize injection grouts. This example shows how those kinds of mixers can be utilized to fibrillate a labile pulp to a highly effective additive.

Test Setup and Results

Figure 15:
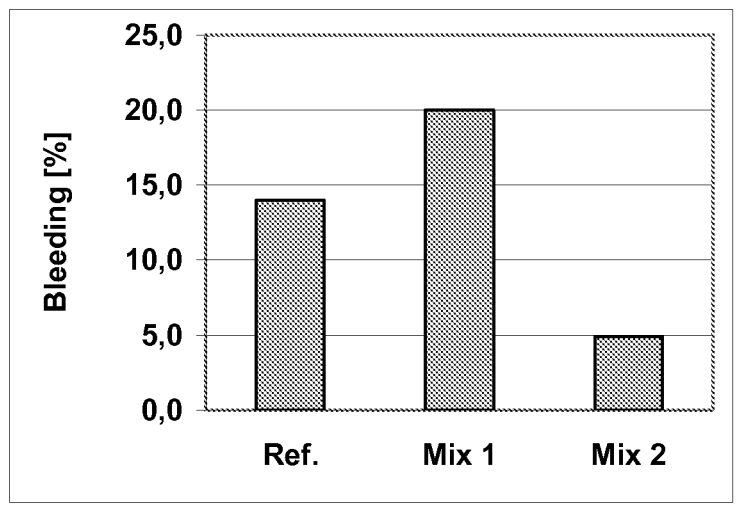
FIG. 15 depicts water bleeding (after 2 h) for reference mixtures with w/c 1.00 and for mixtures containing labile cellulose pulp (Mix 1, precursor of MFC-L1) and MFC-L1 fibrillated using Desoi AKM-70D 1 (Mix 2), also with w/c 1.00.
Figure 16:
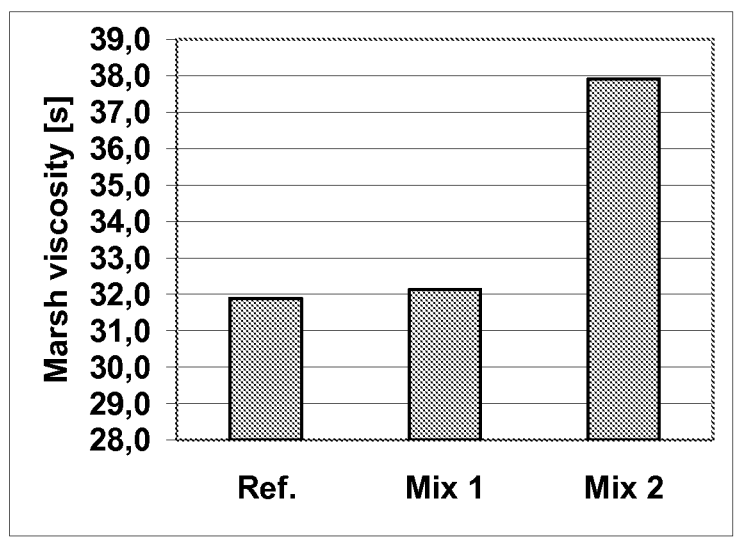
FIG. 16 depicts Marsh viscosity values for reference mixtures with w/c 1.00 and for mixtures containing labile cellulose pulp (Mix 1, precursor of MFC-L1) and Desoi AKM-70D fibrillated MFC-L1 (Mix 2), also with w/c 1.00.

Compositions and testing results for injection grout mixtures with labile chemically modified cellulose pulp, i.e. the same pulp which was used for manufacturing MFC-L1, without and with pre-dispersing are presented in Table 7 and FIGS. 15 and 16. Reference without any cellulose pulp is also included.

In pre-dispersing dry material (dry labile cellulose pulp) content was 1% in water. Pre-dispersing was performed by a high speed mixer (Desoi AKM-70D) at 10 000 rpm. The obtained pre-dispersed cellulose pulp with 1% dry material content was used in the preparation of injection grout.

Mixing of cement, water and cellulose (pre-mixed or without pre-mixing) was carried out at 5 000 rpm. Water was added first, then cellulose with a short premixing time (less than 5 s) and then cement. Mixing time with cement was 2 minutes.

The experiments showed, that pre-dispersed labile chemically modified cellulose pulp decreased injection grout water bleeding and increased Marsh viscosity. Without pre-dispersing water bleeding was not decreased and Marsh viscosity was not increased.

Water bleeding tests showed that as pre-dispersed labile chemically modified cellulose pulp decreased water bleeding of a w/c 1.00 grout by 65%.

Based on Marsh viscosity testing it can be concluded, that as pre-dispersed labile chemically modified cellulose pulp increased viscosity of a w/c 1.00 grout ca 19%.

TABLE 7

Composition of injection grouts without and with labile chemically modified cellulose pulp (precursor of MFC-L1) both without and with pre-dispersing.

| | Ref. | Mix 1 | Mix 2 |
|---|---|---|---|
| Pre-dispersing (10 000 rpm) | — | no | yes |
| Cellulose product dry material content [%] | — | 2.68 | 1.00 |
| Cellulose product water content [%] | — | 97.32 | 99.00 |
| Cement [kg/m$^3$] | 756 | 756 | 756 |
| Total water [kg/m$^3$] | 756 | 756 | 756 |
| Cellulose product including water [kg/m$^3$] | 0 | 36.65 | 98.25 |
| Cellulose product dry material [kg/m$^3$] | 0.00 | 0.98 | 0.98 |
| Cellulose product water [kg/m$^3$] | 0.00 | 35.67 | 97.27 |
| Dry cellulose [% of cement] | 0.00 | 0.130 | 0.130 |
| Dry cellulose [% of water] | 0.000 | 0.130 | 0.130 |
| w/c | 1.00 | 1.00 | 1.00 |
| Mix temperature [° C.] | 25.2 | 23 | 23.1 |
| Marsh viscosity [s] | 31.9 | 32.12 | 37.9 |
| Water bleeding [%] | — | — | — |
| at [h] | — | — | — |

TABLE 7-continued

Composition of injection grouts without and with labile chemically modified cellulose pulp (precursor of MFC-L1) both without and with pre-dispersing.

|     | Ref. | Mix 1 | Mix 2 |
|-----|------|-------|-------|
| 0.0 | 0.0  | 0     | 0     |
| 0.8 | 5.0  | 15.2  | 2.5   |
| 1.0 | 10.0 | 17    | 3     |
| 2.0 | 14.0 | 20    | 4.9   |

The invention claimed is:

1. A cement admixture for use in a cementitious composition, wherein the admixture comprises:
    a cementitious binder;
    microfibrillar cellulose; and/or a derivative thereof; and/or labile chemically modified cellulose pulp or labile chemically modified cellulose raw material which forms microfibrillar cellulose during the use of the admixture;
    wherein the amount of the microfibrillar cellulose is between 0.002% and 0.2% by weight of the cementitious binder in the cementitious composition; and optionally water.

2. The admixture according to claim 1, wherein the admixture is a mixture such as a solid mixture or a dispersion of microfibrillar cellulose and/or a derivative thereof.

3. The admixture according to claim 1, wherein the admixture further comprises at least one plasticizer and/or dispersing agent.

4. The admixture according to claim 1, wherein the admixture comprises microfibrillar cellulose, and wherein the diameter of the cellulose microfibril or microfibril bundles is less than 1 µm.

5. The admixture according to claim 1, wherein the admixture comprises a chemically or physically modified derivative of a cellulose microfibril or microfibril bundles.

6. The admixture according to claim 1, wherein the microfibrillar cellulose is obtained from raw material comprising plant material or derived from bacterial fermentation processes.

7. The admixture according to claim 1, wherein the labile cellulose pulp or labile chemically modified cellulose raw material is obtained by N-oxyl mediated oxidation.

8. A method of manufacturing a cement admixture for use in a cementitious composition according to claim 1 comprising
    providing microfibrillar cellulose and/or a derivative thereof,
    mixing together said microfibrillar cellulose and/or a derivative thereof, and optionally water;
    adding at least one plasticizer and/or dispersing agent prior to, during or after providing microfibrillar cellulose to obtain said admixture;
    wherein the amount of the microfibrillar cellulose is between 0.002% and 0.2% by weight of a cementitious binder in the cementitious composition.

9. A method for modifying rheology or controlling segregation of a cementitious composition comprising providing an admixture according to claim 1.

10. A cementitious composition comprising an admixture as defined in claim 1.

11. The cementitious composition according to claim 10, wherein the water to cement ratio is 1.0 or less.

12. The cementitious composition according to claim 10, wherein the amount of microfibrillar cellulose is 2% or less by weight of water and wherein the water to cement ratio is 1.0 or more.

13. The cementitious composition according to claim 10, wherein the composition further comprises at least one plasticizer and/or dispersing agent.

14. The cementitious composition according to claim 10, wherein the cementitious composition is concrete.

15. A method of manufacturing a cementitious composition according to claim 10, comprising
    mixing together a cementitious binder, aggregate material, water and a cement admixture, wherein the admixture comprises microfibrillar cellulose; and/or a derivative thereof; and/or labile chemically modified cellulose pulp or labile chemically modified cellulose raw material which forms microfibrillar cellulose during the use of the admixture; and optionally water; and
    optionally adding at least one plasticizer and/or dispersing agent.

16. The method of claim 15, wherein the microfibrillar cellulose is obtained from labile chemically modified cellulose pulp or labile chemically modified cellulose raw material during the manufacture of a cementitious composition.

17. The method according to claim 15 wherein the water to cement ratio is 1.0 or less.

18. The method according to claim 15, wherein the amount of microfibrillar cellulose in the admixture is 2% or less by weight of water and wherein the water to cement ratio is 1.0 or more.

19. A construction element made of the cementitious composition according to claim 10.

20. The admixture according to claim 1, wherein the admixture comprises microfibrillar cellulose, and wherein the diameter of the cellulose microfibril or microfibril bundles is less than 200 nm.

21. The admixture according to claim 1, wherein the admixture comprises microfibrillar cellulose, and wherein the diameter of the cellulose microfibril or microfibril bundles is less than 100 nm.

22. A cement admixture for use in a cementitious composition, wherein the admixture comprises:
    a cementitious binder;
    microfibrillar cellulose; and/or a derivative thereof; and/or labile chemically modified cellulose pulp or labile chemically modified cellulose raw material which forms microfibrillar cellulose during the use of the admixture,
    wherein a cationic and/or anionic substance is adsorbed on a surface of the microfibrillar cellulose, derivative thereof, and/or labile chemically modified cellulose pulp or cellulose raw material which forms microfibrillar cellulose during the use of the admixture; and
    wherein the amount of the microfibrillar cellulose is between 0.002% and 0.2% by weight of the cementitious binder in the cementitious composition;
    optionally water.

23. The cementitious composition according to claim 10, wherein the amount of microfibrillar cellulose is 0.2% or less by weight of water and wherein the water to cement ratio is 1.0 or more.

24. The method according to claim 15, wherein the at least one plasticizer and/or dispersing agent is added prior to or during the preparation of a cementitious composition.

25. The method according to claim 15, wherein the amount of microfibrillar cellulose in the admixture is 0.2% or less by weight of water, and wherein the water to cement ratio is 1.0 or more.

26. The cementitious composition according to claim 10, wherein the cementitious composition is self compacting concrete.

27. The cementitious composition according to claim 10, wherein the cementitious composition is selected from the group consisting of mortar, grout and injection grout.

* * * * *